United States Patent Office 2,748,086
Patented May 29, 1956

2,748,086

PROCESS FOR INHIBITING FOAM

Louis T. Monson, Puente, Calif., assignor to Petrolite Corporation, a corporation of Delaware No Drawing. Application December 18, 1951,
Serial No. 262,324

8 Claims. (Cl. 252—321)

This invention relates to a process for reducing or destroying foam or inhibiting its formation, in compositions of either aqueous or non-aqueous nature.

Foams occur as undesirable, incidental features in many industrial processes. The theory of their formation is not highly developed; so that hypotheses on which foam reduction or destruction processes might be based are difficult to formulate. As a consequence, foam-destroying agents are usually devised for use in the case of particular foams.

I have discovered a novel process of reducing or destroying foams and of preventing their formation, which appears to be relatively general in applicability, in that it may be used on compositions comprising aqueous materials or solutions; on compositions comprising non-aqueous materials, such as hydrocarbon liquids; and on compositions comprising mixtures of aqueous and non-aqueous media. My process consists in subjecting a foaming or potentially-foaming composition to the action of a small proportion of a reagent or anti-foamer of the kind subsequently described, thereby causing the foaming properties of the liquid to be diminished, suppressed or destroyed. In applying my process to the reduction or destruction of a foam, the reagent may be poured or sprayer or dripped into the body of foam on top the liquid, as desired; and the foam breaks and is destroyed or reduced, substantially at once, as a consequence of such addition of said reagent. Adding the reagent to the liquid underlying such already-formed foam is also practicable. In applying my process to the prevention of foaming, the reagent is admixed, in some small proportion, with a potentially-foaming liquid, by any desired or suitable procedure. The ability of the system to foam is destroyed or at least materially reduced by such addition of said reagent.

The reagents which I have found to have utility in inhibiting foam are esters of polycarboxy acids and polyalkylene glycols. These may be prepared most conveniently by reacting polycarboxy acids with the desired polyglycol.

Polycarboxy acids suitable for use in preparing the present foam inhibitors of anti-foamers include the commonly available organic dicarboxy and polycarboxy acids which are resistant to decarboxylation and pyrolysis under the usual conditions of esterfication. Of particular interest and value are the dicarboxylic acids, like the aliphatic dicarboxylic acids: oxalic, malonic, succinic, glutaric, adipic, pimelic, azelaic, sebacic, maleic, fumaric, diglycolic, ethylene bisdiglycolic, citraconic, itaconic, dimeric fatty acids and the like. These and similar dibasic acids are easily reacted with the polyglycols specified below, to yield the desired esters.

Carbonic acid is a suitable acidic reactant. It is best employed as its diester, such as diethyl carbonate; from which the desired esters are formed by alcoholysis and evolution of the low-boiling alcohol thereby liberated. Similarly, any other of the polybasic acids employed may be used in the form of esters of low-boiling monohydric alcohols. Where the acid anhydride exists or is more readily available, it may be used instead of the polybasic organic acid.

Other readily usable dibasic acids include phthalic acid, terephthalic acid, isophthalic acid, and adducts of maleic acid with various unsaturated hydrocarbons such as diisobutylene, butadiene, retene, alpha-pinene, etc.

Organic acids having a functionality greater than two may also be employed to obtain my polyglycol esters. Where such acids are used, it is sometimes necessary to control rather carefully the reaction conditions and/or the proportions of acid and polyglycol, to avoid formation of gel-like or rubbery products. Examples of suitable acids of functionality greater than two include aconitic acid, hemimellitic acid, trimellitic acid, acids obtained from brown coal, maleic acid adducts of linolic acid, etc.

One may employ a mixture of such polycarboxy acids if desired.

The polyglycol reactants employed to produce my reagent are alkylene-ether glycols, preferably those containing a considerable number of ether oxygens, for example, as many as 30 such linkages, and in which the alkylene radical contains 10 carbon atoms or less, and preferably less than 6. Examples of such polyglycols include the various isomeric diethylene-, dipropylene-, and dibutylene glycols, triethylene glycol, tetraethylene glycol, nonaethylene glycol, tripropylene glycol, tetrapropylene glycol, polypropylene glycols having molecular weights of the order of 2,000; di-decamethylene glycol; mixed polyglycols like ethylene-propylene polyglycols, propylene-butylene polyglycols, and the like. Such mixed polyglycols contain one or more occurrences of two or more oxyalkylene radicals. For example, ethylene-propylene polyglycol has the formula $HO(C_2H_4O)_x(C_3H_6O)_yH$. Where glycols of this type are prepared from a mixture of glycols, or, for example, by reaction of a glycol with several alkylene oxides to form higher-molecular-weight glycols, the exact locations of the several constituent alkylene groups in the molecule of polyalkylene glycol are not readily determinable. Such heteroether glycols are suitable for use in preparing the reagents of the present process.

A mixture of polyglycols may be employed to produce my reagents, if desired.

Where the product to be formed has, for example, only 1 equivalent of polycarboxy acid residue and 2 equivalents of polyglycol residue, it may be prepared by oxyalkylating the free acid by means of the proper alkylene oxide. For example, 1 mol of diglycolic acid may be oxyethylated with 2 mols of ethylene oxide or oxypropylated with 2 mols of propylene oxide so that both carboxyl groups are esterified. Subsequent continued introduction of alkylene oxide produces the desired polyglycol ester.

The preparation of the polyesters used herein is readily conducted by direct reaction of the acid and the glycol, using conventional esterification procedure. The temperature of reaction may conveniently be from slightly above 100° C. to as high as about 275° C. in some instances. Where the reactants are not so low-boiling as to prohibit it, I usually prefer to conduct the esterification under atmospheric pressure at about 200° C. The use of conventional esterification catalysts, such as sulfuric acid, toluene sulfonic acid, beta-camphor sulfonic acid, etc., usually accelerates the esterification reaction materially. Passage of an inert gas through the reaction mass is usually beneficial. Carbon dioxide, so used, acts both as a catalyst and as an entraining agent to remove water of reaction.

The polyesters of greatest interest in my process have molecular weights in the range of about 700 or 1,000 up to 10,000, and particularly within the range of about 1,500 and 4,000. Polypropylene glycols begin to become oil-soluble and water-insoluble at about 600 molecular weight. Average molecular weights may be determined by any suitable method. Determination of acid number of polyesters prepared from mixtures containing at least 1 mol of acid for each mol of glycol (and hence containing terminal carboxyl groups) is a convenient method of estimating molecular weight. See Flory, J. Am. Chem. Soc., 62, 1057 (1940).

Continued heating will increase the degree of polymerization of such compositions, as is well-known. See for example the table in U. S. Patent No. 2,562,878, to Blair, dated August 7, 1951.

I have found that, when both the polyglycol and the polycarboxy acid are of relatively low molecular weight, the esters made from them, even when rather highly polymerized, are not particularly effective anti-foamers. In fact, in extreme cases, they appear actually to promote foam formation in some systems. For example, the esters of diglycolic acid with di- and tripropylene glycol show substantially no anti-foamer effectiveness on protein adhesive foams, so far as I have examined them.

It is therefore preferable, in practising my invention, to employ those esters whose monomers contain more than about 12 carbon atoms. In other words, where a low-order polyglycol is used, a relatively higher-molecular-weight polycarboxy acid is preferably employed, and vice versa.

My invention includes the esters produced from polyglycols and polycarboxy acids, the equivalent proportions of the reactants lying between 0.5 and 2.0. This means that there may be, as one limiting case, 2 equivalents of polyglycol per equivalent of polycarboxy acid; while at the other limit is the compound produced from 0.5 equivalent of polyglycol and 1.0 equivalent of polycarboxy acid.

It is my preference to employ the acidic fractional esters, however, in which there is present something more than 1 equivalent and not more than 2 equivalents of polycarboxy acid for each equivalent of polyglycol. Within this preferred class, I especially prefer those made from relatively-high-molecular-weight polyglycols, such as the aforementioned polypropylene glycol known as Polypropylene Glycol 2,000. My preferred polycarboxy acid reactant is diglycolic acid.

*Example 1*

Nonaethylene glycol, 414 grams, and phthalic anhydride, 148 grams, are heated at about 135° C. until no crystals are found on cooling a drop on a glass plate.

*Example 2*

Repeat Example 1 but use 828 grams of nonaethylene glycol instead of the 414 grams there used.

*Example 3*

Repeat Example 1 but use 296 grams of phthalic anhydride instead of the 148 grams there used.

*Example 4*

Polypropylene glycol of approximately 2,000 molecular weight, 2,000 grams, diglycolic acid, 134 grams, and p-toluene sulfonic acid, 2 grams, are heated in the presence of 2,000 grams of xylene in a Dean & Stark water-distillation apparatus until approximately 18 grams of water have been evolved.

*Example 5*

Repeat Example 4 above but use 268 grams of diglycolic acid instead of the 134 grams used there; and continue reflux-and-distillation until approximately 36 grams of water have been evolved.

*Example 6*

Reflux molal proportions of adipic acid and triethylene glycol at about 200° C., while passing a stream of carbon dioxide through the mixture. After about 7 hours the average molecular weight of the ester formed is about 1,100.

*Example 7*

Continue heating the reaction mass of Example 6 for 5 more hours, when average molecular weight will be found to be about 2,700.

*Example 8*

Place 134 grams of diglycolic acid in an autoclave, add 2.75 grams finely-powdered sodium hydroxide, purge with nitrogen, and pass in 440 grams of ethylene oxide, at a temperature of about 165° C., and a pressure of about 50 p. s. i. g.

*Example 9*

Place 134 grams of diglycolic acid in an autoclave, add 2.75 grams finely-powdered sodium hydroxide, and purge with nitrogen. Pass in 580 grams of propylene oxide, using a temperature of about 170° C. and a pressure of about 50 p. s. i. g.

*Example 10*

Repeat Example 9 but use 220 grams of ethylene oxide and 290 grams of propylene oxide instead of the 580 grams of propylene oxide used in the preceding example.

*Example 11*

Polypropylene glycol of about 2,000 molecular weight, 2,000 grams, and phthalic anhydride, 148 grams, are heated at about 135° C. in the presence of 2 grams of p-toluene sulfonic acid, until a drop on a glass shows no evidence of crystals.

*Example 12*

Repeat Example 11 but use 296 grams of phthalic anhydride instead of the 148 grams there used.

*Example 13*

Polyethylene glycol of about 1,300–1,600 molecular weight, 1,500 grams, and maleic anhydride, 98 grams, are heated for 10 hours at 100° C., with stirring, in the presence of 1.5 grams p-toluene sulfonic acid.

*Example 14*

Repeat Example 13 except use 196 grams of maleic anhydride instead of the 98 grams there used, and extend the heating period to 15 hours.

The acidic fractional ester derived from 1 mol of polypropylene glycol of 2,000 molecular weight and 2 mols of diglycolic acid, as illustrated by Example 5 above, may be taken as the preferred example of the present class of reagents.

My present class of oxyalkylated resinous derivatives may be used alone in foam inhibition, or they may be used in admixture with any other effective and compatible anti-foamer, e. g., with the reagents described and claimed in my U. S. Patent No. 2,408,527, dated October 1, 1946, those described and claimed in my co-pending application, Serial No. 775,145, filed September 19, 1947, now Patent 2,622,070, granted December 16, 1952, or those described and claimed in my co-pending application, Serial No. 180,691, filed August 21, 1950 now Patent 2,622,069, granted December 16, 1952.

It is usually convenient to dilute my reagents during manufacture or before use with some suitable solvent. Solvents generally suitable for incorporation into my reagent include: water; petroleum hydrocarbons, like gasoline, kerosene, stove oil, aromatic solvent; coal tar products, such as benzene, toluene, xylene, tar acid oil, cresol, anthracene oil; alcohols, particularly aliphatic alcohols like methyl, ethyl, isopropyl, butyl, hexyl, octyl, etc. Miscelaneous solvents, such as pine oil, carbon tetrachloride, etc., may be employed. Sometimes other factors such as whether it imparts an objectionable odor to the defoamed composition or to the products into which it finds its way will determine the choice of solvent. In general, the amounts of finished anti-foamer reagent employed are so small that considerable tolerance of undesirable properties in a solvent exists.

The mixture of active ingredients and solvents is stirred until homogeneous. I prefer to employ a petroleum distillate in the proportion of 25 to 50% of the finished product, by volume, although water is an excellent solvent in some instances.

I desire to point out that the superiority of the reagent contemplated in my process is based upon its ability to reduce or destroy foam, or to prevent foam formation, in certain foaming or potentially foaming compositions more advantageously and at lower cost than is possible with other reagents or processes. In certain instances, it has been found to destroy or reduce foams or prevent their formation, which foams were not economically or effectively reducible or preventable by any other known means.

My reagents are useful in controlling foams in many different types of systems, aqueous and non-aqueous. They will control foams encountered in the manufacture of alkaline hypochlorite bleaches. They are effective in controlling foam in petroleum refining operations. They are effective in inhibiting foam in a gas-treating system, in which a mixture of glycols and alkanolamines is used to dehydrate and purify natural gas.

I have applied my reagents to the control of foam in protein adhesives solutions, such as casein and soybean adhesives, as used in the plywood industry. Latex adhesives, printing inks, aqueous emulsion paints, all produce foams which are amenable to my reagents.

In the foregoing description, I have made it clear that my reagents may be used to reduce, destroy, or prevent foam. In the appended claims I have used the word "inhibit" to include all these corrective and preventive aspects of my process and reagents.

The procedures employed in practising my process are numerous. The following description will illustrate several techniques commonly employed. It should be understood that the claims are not limited to the procedures described; and that my process consists broadly in bringing into contact by any suitable means my reagent and the foam or the potentially foaming composition.

In controlling foam in a glycol-amine gas treating plant handling natural gas, the glycol-amine mixture had a volume of about 2,000 gallons and make-up was about 2,000 gallons a month. My preferred reagent was injected into the liquid mixture in the return line from the stripping operation, by means of an electrically-powered proportioning pump of conventional design. The feed rate was less than 1 quart daily. Foam difficulties in the system were satisfactorily controlled by this procedure.

In sewage plants, for example, in activated-sludge-process plants, foam is frequently a serious problem in aeration basins and elsewhere. In one such plant, I have demonstrated that my reagent will control foam when sprayed into the head of foam, or when sprayed into or simply poured into the liquid in such basin. The foam-inhibiting effect appears to persist quite satisfactorily.

Determination of the optimum or minimum amount of my foam-inhibiting reagent to be used in any application may be accomplished in different ways. Small portions of the potentially foaming liquid my be filled into test bottles, different small proportions of my reagent added, and the chemicalized samples shaken for a short time. Simple observation of the relative speed and completeness of foam destruction should permit selection of the best reagent proportion to be applied on the large scale. The easiest way to determine the amount of my reagent required is to introduce it into the foaming or potentially foaming liquid in a fairly large proportion, e. g., 1%, and then to reduce the reagent feed rate until foam destruction is just being accomplished satisfactorily. Usually foam destruction is directly proportional to the amount of reagent used, at least up to about 1% of reagent. In a few instances, it may be found that using more or less reagent than an optimum proportion will give inferior results.

If the proportions of reagent to be employed in the above test are very small, it may be desirable to determine the optimum proportions of foaming composition and anti-foamer by introducing the latter into the sample of foaming liquid in the form of a solution in a suitable solvent.

Throughout this specification, I have shown that my process is equally applicable to systems in which a foam is already in existence and to systems which are potentially foaming compositions, in that they have the property of producing foams when agitated or mixed with air or some other suitable gas. Destruction, reduction and prevention are substantially equivalent actions. It is impossible to determine whether the reagent does in fact prevent the formation of the initial laminae of foam or whether such initial laminae are destroyed by the reagent before subsequent laminae of sufficient stability to produce a foam can be superimposed thereon. By "foaming composition" in the appended claims, I mean a composition which is either actually foaming or which is capable of producing a foam under suitable conditions, e. g., by simply passing air through it.

In most instances, my reagent is effective to the extent that it destroys an existing foam substantially completely. In some instances, as when too little reagent is used, foam reduction may be slow or even incomplete. I intend that this description and my invention relate both to complete destruction and to partial destruction of foams.

The proportions of my reagent required to be employed appear to vary widely. However, I wish to limit my invention to the use of my reagent in amounts 1% or less of the foaming composition. Usually, the amounts required will be between 0.1% and 0.0001%.

I have stated above that my present reagents may be used in conjunction with any other effective and compatible anti-foamer. It should also be stated that they are useful in conjunction with foam-inhibiting processes which are mechanical or electrical in character, rather than chemical. For example, some foams may be effectively destroyed by water sprays or jets. Incorporation of a small proportion of my reagents into such water sprays increases their effectiveness. U. S. Patent No. 2,240,495, to Dillon et al., dated May 6, 1941, relates to a process for resolving foam by means of a high electrical potential. Incorporation of a small proportion of my present reagents into the foaming liquid increases the effectiveness of such electrical processes.

What I consider novel and desire to secure by Letters Patent is:

1. A process for inhibiting foam characterized by subjecting a non-detersive foaming composition to the action of not more than 1 per cent of an acidic esterification product of a dicarboxy acid and a polyalkylene glycol in which the ratio of equivalents of dicarboxy acid to polyalkylene glycol is within the range of 1.1 to 2.0, in which the alkylene group has from 2 to 3 carbon atoms and in which the molecular weight of the product lies between 1,500 and 4,000.

2. A process for inhibiting foam characterized by subjecting a non-detersive foaming composition to the action of not more than 1 per cent of an acidic esterification product of a dicarboxy acid and a polyakylene glycol in which the ratio of equivalents of dicarboxy acid to polyalkylene glycol is within the range of 1.1 to 2.0, in which the alkylene group has from 2 to 3 carbon atoms and in which the molecular weight of the product lies between 1,000 and 10,000.

3. A process for inhibiting foam, characterized by subjecting a non-detersive foaming composition to the action of not more than 1% of an acidic esterification product of a dicarboxy acid and a polypropylene glycol, in which the molal ratio of dicarboxy acid to polypropylene glycol is within the range 1.1 to 2.0, and in which the molecular weight of the product lies between 1,500 and 4,000.

4. The process of claim 3, wherein the dicarboxy acid is diglycolic acid.

5. The process of claim 3, wherein the dicarboxy acid is phthalic acid.

6. The process of claim 3, wherein the dicarboxy acid is maleic acid.

7. The process of claim 3, wherein the dicarboxy acid is adipic acid.

8. The process of claim 3, wherein the dicarboxy acid is oxalic acid.

References Cited in the file of this patent

UNITED STATES PATENTS

| | | |
|---|---|---|
| 2,390,212 | Fritz | Dec. 4, 1945 |
| 2,562,878 | Blair | Aug. 7, 1951 |
| 2,575,276 | Jacoby et al. | Nov. 13, 1951 |